Figure 1:
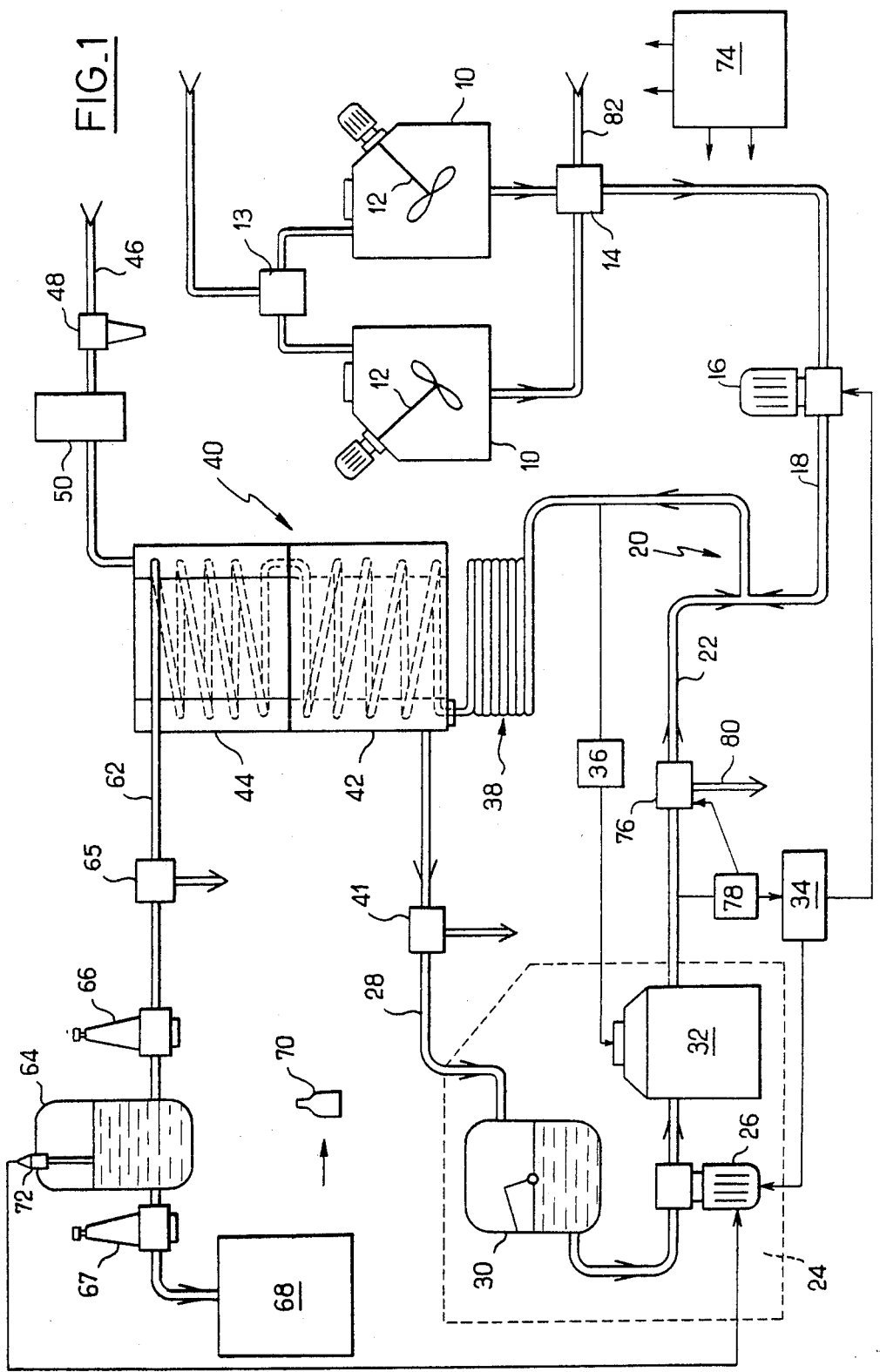

United States Patent [19]

Torterotot

[11] Patent Number: 4,583,453

[45] Date of Patent: Apr. 22, 1986

[54] PROCESS FOR THE PREPARATION AND HEAT TREATMENT OF FOOD PRODUCTS AND APPARATUS FOR PERFORMING SAID PROCESS

[76] Inventor: Roland Torterotot, Le Plessis Mornay, 78730 Longvilliers, France

[21] Appl. No.: 588,524

[22] Filed: Mar. 12, 1984

[30] Foreign Application Priority Data

Mar. 29, 1983 [FR] France .................... 83 05149

[51] Int. Cl.⁴ .............................. A23C 3/00
[52] U.S. Cl. ...................... 99/455; 99/453; 99/483
[58] Field of Search .............. 99/483, 452–455, 99/516, 518; 366/150, 177, 336, 337, 341; 426/521, 522

[56] References Cited

U.S. PATENT DOCUMENTS 4,416,194 11/1983 Kemp ...................... 99/483 X

*Primary Examiner*—Timothy F. Simone
*Attorney, Agent, or Firm*—Mason, Kolehmainen, Rathburn & Wyss

[57] ABSTRACT

The present invention relates to a process for the preparation and heat treatment of food products and to the apparatus for performing said process.

In the process according to the invention, the mixing and heat treatment operations are carried out simultaneously by the injection, under pressure, of the concentrate and at least part of the constituting liquid, superheated to a temperature above about 100° C., into a tubular chamber which is closed so as to prevent any vaporization of the constituting liquid; the apparatus for performing the process according to the invention contains a tubular mixing chamber (20) connected on the one hand to a metering pump (16) delivering the concentrate withdrawn from at least one storage tank (10), and on the other hand to a generator (24) of superheated constituting liquid.

11 Claims, 3 Drawing Figures

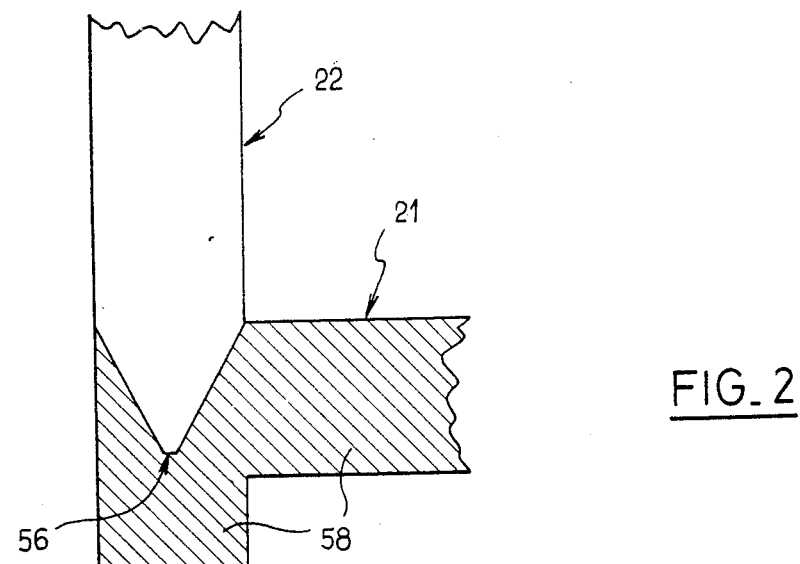
FIG_2
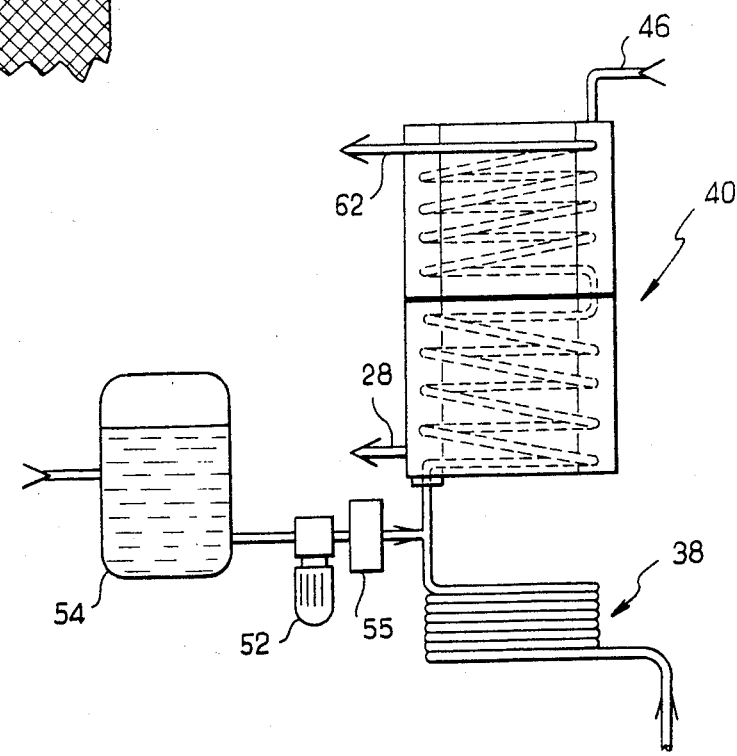
FIG_3

PROCESS FOR THE PREPARATION AND HEAT TREATMENT OF FOOD PRODUCTS AND APPARATUS FOR PERFORMING SAID PROCESS

The present invention relates to a process for the preparation and heat treatment of food products containing a preponderant fraction of constituting liquid, the said process being of the general type comprising an operation involving the mixing of an appropriate volume of constituting liquid with a concentrate containing the basic ingredients of the food product, and also a heat treatment operation intended for preserving the product. This latter heat treatment operation can equally well consist of either sterilization or pasteurization.

The present invention relates in particular, but not exclusively, to the reconstitution or manufacture of liquid food products by diluting with water a concentrate containing the basic ingredients of the food product. Examples of these liquid food products which may be mentioned are fruit juices and natural milk or milk to which various flavorings have been added. However, the present invention also extends to food products which are in a more or less gelled form and which can also contain solid pieces, in particular pulpy substances such as pieces of fruit.

Many countries or regions in the world do not have a local source for the production of some of these liquid food products, in particular milk or fruit juices. Consequently, the existence of uneconomic distances between producers and consumers makes it very advantageous to manufacture such products in situ from their constituents, in powder or concentrate form, and water. Once reconstituted, these liquid products must be subjected to a preserving treatment (sterilization, pasteurization, holding-hot, etc.) and then packaged under sterile conditions.

The processes used hitherto consist of preliminary reconstitution of the food product with intermediate storage in a tank, followed by heat treatment for sterilization or pasteurization. Furthermore, the heat treatment is usually carried out either indirectly through walls, or directly by injecting high-temperature steam into the reconstituted product or by causing the latter to fall as droplets into a jet of high-temperature steam. The indirect heating procedure has the disadvantage of creating deposits against the walls, or a caramelization phenomenon, and the direct heating procedure has the disadvantage of incorporating into the treated product a quantity of excess water, which must subsequently be removed.

As a result of what has been stated above, the known processes are complex and costly in terms of investments, people and energy.

The object of the invention is in fact to overcome these various disadvantages, and the invention also makes it possible to dispense with the intermediate stage of storing the reconstituted product before heat treatment.

This object is achieved according to the present invention by virtue of a process which consists essentially in using, to reconstitute the food product, a constituting liquid, for example water, heated to a temperature such that it produces a reconstituted mixture whose temperature is similar to that at which the desired heat treatment is to be carried out. Thus, by means of this process, liquid food products are prepared, in particular reconstituted, and simultaneously preserved by heat treatment. This gives the finished food products not from products reconstituted in an intermediate step, but directly from concentrates or from powders converted to concentrates by thinning with a small quantity of constituting liquid. Now, the storage of the concentrates or powders, which can be carried out without taking any particular precautions, is easier and less expensive, because of their smaller volume, than that of the reconstituted liquid products, the main component of which is, for example, water. Moreover, heating the food products in situ, in the liquid phase, by dilution with superheated water ensures that they are at a uniform temperature, reached instantaneously, without any risk of decomposition in contact with the walls, which happens when the heating is carried out externally through the walls of a container. In addition, this decomposition affects the organoleptic properties of the finished product and causes clogging of the equipment. Furthermore, the method of heat treatment according to the present invention prevents, ipso facto, the inadvertent incorporation of any excess water into the products prepared, since the superheated water is in fact added in a quantity corresponding exactly to the desired degree of dilution.

According to another characteristic of the present invention, after a sufficient heat treatment time to ensure preserving of the food product, the said product is optionally cooled directly and instantaneously by the injection under pressure of an additional volume of sterile constituting liquid, which is approximately at a temperature of between 5° and 50° C. and which may contain heat-sensitive additives.

In fact, in the case where certain liquid substances such as milk are reconstituted, it may be necessary to cool the product very rapidly after a short period of mixing and holding-hot. In such a case, the heat treatment is only carried out with part of the super-heated constituting liquid, the remaining part subsequently being injected, cold and in sterile form, in order to ensure sudden cooling.

The temperature of the cooling liquid will of course depend on the additional quantity of sterile water injected cold.

It is perfectly clear that, in the case of heat exchangers of the plate or tube type, this sudden cooling is absolutely impossible because of the large thermal inertia inherent in this type of indirect treatment. Nevertheless, the present invention makes it possible to solve this problem in a very elegant and effective manner.

In the particular case of a liquid food product which is to be reconstituted from 75 parts of constituting liquid and 25 parts of concentrate, it is possible, for example, to carry out incomplete reconstitution and a heat treatment with only 45 parts, for example, of constituting water. Thus, an incompletely reconstituted liquid is subjected to the heat treatment.

At the end of the mixing and holding-hot operations, for example after about 5 seconds, the remainder of the reconstituting liquid, for example 30 parts, in particular cold sterile water under pressure, is then injected, which makes it possible to complete the reconstitution of the food product and simultaneously to cool the said product instantaneously.

The sterile cold water is thus injected at a pressure of the order of about $8.10^5$ Pa, for example, and can of course also contain soluble vitamins or other additives which would be destroyed or denatured during the initial heat treatment operation.

In order to avoid the use of water superheated to an excessive temperature for bringing the food product to the appropriate treatment temperature, the fraction corresponding to the concentrate in the reconstituted product must not be too large. In the case of milk or fruit juices obtained from a pulverulent mixture, the concentrate fraction represents about 20 to 50% by weight of the reconstituted product.

According to other additional characteristics of the present invention, the temperature of the superheated constituting liquid is, for example, between about 105° and about 200° C. If this constituting liquid is superheated water, for example, it can be injected under a pressure of the order of $18.10^5$ Pa. The concentrate is injected under a lower pressure, for example of the order of $8.10^5$ Pa.

Advantageously, the constituting liquid and the concentrate are injected in countercurrent in order to assist the formation of an intimate mixture.

It has also been found in practice that the concentrate should preferably be injected in an ascending direction. Such an arrangement in fact prevents the concentrate, under the action of gravity, from tending to migrate towards the actual mixing zone, which must remain sterile even if the process is interrupted. This point will be developed in greater detail later, especially with reference to FIG. 2.

The process according to the present invention proves particularly advantageous if the food product prepared and heat-treated in this way is directly packaged under sterile conditions, after cooling. This makes it possible, without any intermediate step, to pass from the product transported and stored in the form of powder or concentrate to the final food product in a sterile pack and ready for distribution.

The present invention also relates to an apparatus making it possible to perform the process defined above. This apparatus comprises a tubular mixing chamber connected on the one hand to a metering pump delivering the concentrate withdrawn from at least one storage tank, and on the other hand to a generator of superheated constituting liquid. This generator preferably comprises an injection pump feeding the mixing device with, for example, superheated water. This pump and the above-mentioned metering pump are controlled so that their chosen outputs constantly remain proportional, the proportionality factor depending on the degree of dilution required for manufacturing each food product.

The tubular mixing chamber is advantageously equipped with a thermostatic sensor effecting the regulation, as a function of the temperature in this zone, of the heating module with which the superheated water generator is provided, so that the heat treatment takes place correctly.

According to another characteristic of the apparatus of the invention, the latter contains, downstream of the tubular mixing chamber, a device for injecting cold sterile water under pressure and at a controlled temperature.

In place of, or together with, this device for injecting cold sterile water, the apparatus can also be equipped, downstream of the tubular mixing chamber, with a heat exchanger in which the food product is cooled. Thus, in the particular case where a food product is reconstituted by simply adding to the concentrate a quantity of water equal to that which was removed during the concentration of the product, for example fruit juice or milk, it is advantageous to couple the exchanger cooling circuit to the water feed circuit of the superheated water generator. It thus becomes possible to recover heat extracted by the exchanger during the cooling of the reconstituted product, for the purpose of preheating the feed water for the said generator.

The inlet and outlet of the tubular chamber of the apparatus are equipped respectively with non-return means and back-pressure means. These means are essential since it is they which ensure that a sufficient pressure is maintained inside the tubular chamber to prevent the superheated constituting liquid from vaporizing. In fact, it has already been seen that the presence of vapor in the mixture results in a number of disadvantages, for example by producing condensates which are difficult to control.

A buffer tank is preferably provided at the outlet of the apparatus in order to receive the food product, preferably after cooling, this tank possessing a level sensor which acts on the pump of the generator of super-heated constituting liquid. A characteristic of this type makes it possible to regulate the rate of reconstitution of the product according to the downstream demand, which can be, in particular, that of a sterile packaging unit directly connected to the outlet of the apparatus in order to pack the reconstituted and heat-treated product.

In an advantageous embodiment of the apparatus according to the present invention, the different constituent elements are controlled and regulated by a programmed computer whose program is determined according to each food product prepared. It is thus possible to obtain an entirely autonomous assembly for preparation, heat treatment and sterile packaging, which operates automatically in total safety and without any human intervention apart from the supplying of basic constituents when required. An apparatus of this type can be constructed in a simple and compact form enabling it to be installed at the points of consumption on scantily equipped premises of any kind, which will of course result in a reduction in the distribution costs of the product prepared and packaged in this way, with immediate adaptation to the local market.

Other characteristics and advantages of the present invention will become apparent from the detailed description given below, especially with reference to the attached drawings; in these drawings:

FIG. 1 shows a simplified diagram of a particular embodiment of an apparatus according to the invention, FIG. 2 shows a partial view, on a larger scale, of the particular T-shaped arrangement of the tubular mixing chamber, and FIG. 3 shows a variant of the simplified diagram of the apparatus in FIG. 1.

In the attached FIGS. 1 to 3, identical elements will be denoted by the same reference numbers.

In order to facilitate the detailed description of the apparatus shown in the attached drawings, we will consider the case of performing a process for the reconstitution of a liquid food product prepared by dilution from reconstituting water and the concentrate containing the basic ingredients of the food product. It must be understood, however, that it is perfectly possible to use an installation of this type within the scope of a different process of preparation involving, as the constituting liquid, not water but, for example, a mixture of water and a fat such as a vegetable oil.

The installation shown in FIG. 1 comprises, first of all, two tanks 10 intended for converting the constituents of the food product to concentrates when the product is in powder form. Each of these tanks is charged with this powder and receives a small quantity of water for thinning the powder, this operation being assisted by stirring with a stirrer 12. The tanks 10 are alternately filled and emptied by means of two appropriately controlled three-way valves, namely an inlet valve 13 diverting the thinning water to one or other of the tanks 10, and an outlet valve 14 similarly ensuring the alternate withdrawal of the concentrate from the said tanks. These tanks 10 are preferably thermostatically controlled so that the temperature of the concentrate which they deliver remains constant.

The outlet of the valve 14 is connected to a metering pump 16, which introduces the concentrate—with a constant solids content—into the tubular mixing chamber 20 at a given flow rate of, for example, 100 liters/hour, through the line 18. This tubular mixing chamber 20 also receives, through a line 22, water for reconstituting the product, this water coming from a superheated water generator 24 comprising an injection pump 26, which receives water through a line 28, via a feed regulator 30, and which sends this water into a heating module 32, the outlet of which is connected to the line 22. The pumps 16 and 26 are coupled by a linking device 34 (mechanical or electronic) regulated so that the respective flow rates of concentrate and water lead to a reconstituted product containing the exact proportions desired.

In an advantageous embodiment, the heating module 32 comprises, for example, a boiler which works continuously and whose calorific power can be modified according to the particular treatment to be carried out. This water is heated by the generator 24 to a temperature which is generally above about 100° C. In practice, the temperature of the superheated water is generally between about 105° and about 200° C., so that the temperature of the reconstituted product inside the tubular chamber 20 is similar to the temperature at which the heat treatment is to be carried out. The process and apparatus forming the subject of the present invention prove particularly advantageous for carrying out a sterilizing treatment on the food product. A treatment of this type can be effected, for example, by injecting superheated water under a pressure of the order of about $18.10^5$ Pa at a flow rate of 400 liters per hour, with the aid of the pump 26. It is thus possible to obtain a temperature of the order of 135° C. for in situ treatment of the liquid food product, the pressure prevailing in the tubular chamber of the apparatus being of the order of about $5.10^5$ Pa. Under such operating conditions, the intimate mixing is effected in a fraction of a second, for example ¼ second, and the sterilizing heat treatment, for example in the case of milk, is complete after a period of the order of 2 to 5 seconds. It is clear that, by injecting superheated water at a lower temperature of the order of 100° C., the temperature of the liquid treated becomes less than 100° C. In this case, it is nevertheless possible to use an apparatus of this type for carrying out a pasteurizing treatment on the product.

It is clear that the superheated water must be injected at a temperature above the heat treatment temperature, the difference depending on the nature and the temperature of the concentrate and its proportion in the finished liquid food product.

The corresponding regulation of this temperature can be carried out automatically with the aid of a thermostatic sensor 36 coupled to the tubular mixing chamber 20 and controlling a temperature regulator with which the heating module 32 of the generator 24 is provided.

The tubular mixing chamber 20 is extended by a holding-hot coil 38, which, in the same way as the tubular mixing chamber 20, can advantageously be located in a heat insulating envelope (not shown).

The actual heat treatment, for example sterilization, of the liquid food product is carried out entirely in this tubular chamber 20 and in the holding-hot coil 38. The lines 18 and 22 are provided with non-return valves which, in the event of a fault in one or other of the pumps, prevents the mixture from flowing back either towards the tanks 10 or towards the superheated water generator 24.

The reconstituted food product coming from this holding-hot coil 38, where it has undergone the desired heat treatment for the appropriate time by virtue of reconstitution with the aid of superheated water, must then be cooled before it can be packaged. In fact, it is necessary to reduce the temperature of the liquid food product below its vaporization temperature before it can be packaged.

According to the present invention, this step involving cooling of the sterilized liquid food product can be carried out according to two quite different variants corresponding to indirect cooling or direct cooling.

In a first variant, the heat exchanger 40, whose cooling water circuit includes a discharge valve 41, is joined to the line 28 bringing the water to the generator 24, so that the latter receives water heated by the heat recovered from the reconstituted product by the heat exchanger 40.

As shown schematically in FIG. 1, the heat exchanger 40 can be subdivided into two superposed parts 42 and 44. Thus, with the aid of a suitable system of connecting lines and valves, it is possible to use only one part (42) or both parts (42 and 44) of the exchanger 40. It should be noted that the tubular coil which passes through the heat exchanger 40 has the same internal diameter as all the rest of the tubular chamber of the apparatus. In practice, the total length of the tubular holding-hot coil 38 and the coil of the parts 42 and 44 of the heat exchanger can be as much as 100 meters, the internal diameter being 18 mm. Keeping a constant tube diameter throughout the installation dispenses with any problem of washing the installation and any problem of homogeneity in the treatment of the food product. It should also be noted that the whole of the tubular line running from the zone 20 to the outlet of the heat exchanger 40 does not contain any mechanical element which would be capable of causing any form of pollution by communication with the external environment.

The operation of the valve 41 is controlled according to the cooling needs, i.e. according to the inlet and outlet temperatures of the heat exchanger 40 and to the flow rate of the reconstituted product passing through it, by a thermostatic sensor (not shown) coupled to the outlet of the said exchanger, and according to the temperature of the water from the superheated water generator. Furthermore, the water feed pipe 46 is provided with softeners 48 and a filter 50.

In the second cooling variant of the direct type, the diagram of the installation is modified in the manner illustrated in FIG. 3. In this particular embodiment, the apparatus also contains, immediately downstream of the holding-hot coil 38, a device for injecting cold sterile water under pressure and at a controlled temperature. This device also comprises a pump 52 capable of delivering cold sterile water under a pressure of the order of $8.10^5$ Pa and at a constant flow rate, this water coming from a cold water tank 54 and subsequently passing through a bacteriological filter 55. For safety reasons, a non-return valve can be inserted between the pump 52 and the bacteriological filter 55 in order to keep the installation under pressure even in the event of a defect in the pump 52. It is clear that the temperature and the output of this device for injecting cold sterile water under pressure must be determined according to the particular nature of the product to be prepared. An example which may be mentioned of the use of such an apparatus is the case of a concentrate consisting of one part of powdered milk to which one part of thinning water is added so as to produce, in the tank 10, a pasty liquid or a slurry capable of being pumped. A premix of this type is homogenized with the aid of the stirring device 12; it can be prepared in advance and temporarily stored. In the case where the milk requires the addition of a further 7.5 parts of reconstituting water for its final reconstitution, it is possible, for example, to divide this reconstituting water into two portions. For example, 4.5 parts of water can be used in the form of superheated water for sterilizing the milk, while the other three parts will not be injected until after the sterilizing treatment, by means of the pump 52 downstream of the holding-hot coil 38, in order to ensure instantaneous cooling of the milk. In the particular case where it is desired to add to the milk adjuvants which are sensitive to high temperatures, for example vitamins, it thus becomes possible to introduce them into the product at this subsequent stage without any longer running the risk of thermal degradation.

It is clear, as shown moreover in FIG. 3, that the two variants of the cooling device can be used simultaneously in the same apparatus.

To optimize the operation of the apparatus according to the invention, it is advantageous to use a tubular mixing chamber 20 having approximately the configuration shown in FIG. 2. In this configuration, the tubular mixing chamber 20 adopts the general shape of a T having a vertical tubular branch 18 for the arrival of the concentrate in the ascending direction. The opposite vertical tubular branch 22 is for the feeding, in countercurrent, of the superheated constituting liquid, for example superheated water injected under a pressure of about $18.10^5$ Pa. The third branch of the T, namely the horizontal branch 21, allows the mixture to flow in the direction of the holding-hot coil 38. As shown in FIG. 2, the line for injecting superheated water 22 ends in a nozzle 56 which comes out in the region of the extension of the lower generatrix of the horizontal tubular branch 21. An arrangement of this type makes it possible to avoid any concentrate overheating phenomenon which could result in deposits or crusts on the walls in this zone.

This particular characteristic of the tubular mixing chamber also offers another fundamental advantage, namely that it ensures the presence of an entirely sterile zone 58 beyond the zone into which the horizontal line 21 comes out. Thus, in the event of a breakdown or voluntary shutdown of the apparatus, it is possible to restart the installation with total assurance that sterility has been preserved. The doubly shaded zone 60 corresponds to a buffer zone which will only be partially sterile because of the presence of a concentrate which has not yet undergone the heat treatment operation. In view of the vertical arrangement and the ascending feed of this concentrate, the latter will permanently occupy this position, under the effect of gravity, without running the risk of mixing with the preserved sterile zone 58 represented by single shading.

This particular arrangement of the tubular mixing chamber 20 also makes it possible to change the food product in the apparatus forming the subject of the present invention. This change can be carried out continuously by simply modifying the nature of the concentrate. In such a case, it will be appropriate simply to discharge a certain quantity of a mixture containing both the old and the new product, but it is totally unnecessary to take any particular precautions to maintain the sterility of the apparatus as a whole. The product can also be changed batchwise with prior rinsing using a buffer of superheated water under pressure, which can be recovered after the head and tail fractions have simply been removed. This characteristic of the process and apparatus according to the invention therefore offers a decisive advantage compared with the technique of the prior art involving an external heat treatment, i.e. a heat treatment with the aid of, for example, plate exchangers.

The heat exchanger 40 is then connected by a line 62 to a buffer tank 64, where a stock of reconstituted, heat-treated and cooled product is formed. A pressure reducing valve/regulator 66 with a calibrated back-pressure valve is inserted in the line 62 and prevents the superheated water from vaporizing at the outlet of the generator 24 and in the assembly comprising the tubular mixing chamber and the holding-hot coil 38, before the reconstituted product is cooled. In the event of a product change, the discharging of the mixture containing both the old and the new product, as well as the discharging of the head and tail fractions of the buffer of superheated rinsing water, can advantageously be carried out by means of a discharge valve 65 mounted on the line 62 immediately downstream of the pressure reducing valve regulator 66. This discharge valve 65 will of course be calibrated at a higher pressure than the pressure reducing valve/regulator 66, for example at a pressure of about $8.10^5$ Pa in the case where the pressure regulation in the whole of the tubular line is about $5.10^5$ Pa.

The buffer tank 64 feeds a sterile packaging unit 68 which packs the reconstituted product into containers 70 directly, without any recycling, the sterile nature of the said product being preserved. The buffer tank 64 possesses a level sensor 72 which acts on the regulation of the injection pump 26 of the superheated generator 24 according to the output of the packaging unit 68, and it does this progressively with the possibility of stopping the said pump and, of course, the pump 16.

Thus, it is possible to single out three essential parts in the apparatus described, each part fulfilling a specific function:

a first part comprising the tanks 10, the valves 13 and 14 and the pump 16, which contains the product to be reconstituted in the form of non-sterile concentrate at constant concentration and temperature;

a second part comprising the superheated water generator 24, which supplies at least part of the constituting liquid performing the functions of dilution as well as heat treatment of the non-sterile concentrate; and finally a third part in which the dilution and heat treatment operations take place, and which comprises the tubular mixing chamber 20, the holding-hot coil 38 and the cooling device (or devices) 40, 52, 54, which comes out into the buffer tank 64.

In addition to these three parts described above, there is a fourth complementary part consisting of the sterile packaging unit 68. It is thus observed that the treated product, both before and after reconstitution, flows through this assembly with constant protection from the air and in liquid form, without ever being in the form of steam.

To ensure complete sterilization of the installation prior to any operation for the preparation and heat treatment of food products, superheated water is circulated through the whole of the installation as far as the stage of the buffer tank 64 of the sterile packaging unit 68. To sterilize the buffer tank 64, it is necessary to place the whole of the installation under pressure by bringing the pressure reducing valve/regulator 66 out of the circuit, the pressure being provided by another back-pressure means, for example a pressure reducing valve/regulator 67 inserted in the line connecting the buffer tank 64 to the packaging unit 68.

The operation of the entire apparatus, including the said packaging unit, can advantageously be controlled by a microprocessor 74. It suffices to adapt its program to each particular food product to be treated, so that the running of the operations and the correct regulation points of the apparatus are determined automatically without any manual intervention and hence secure from any risk of human error.

In a stage in which the apparatus is started or re-started after a shutdown, the injection of water into the tubular mixing chamber 20 should not begin before this water has effectively reached the required temperature in the heating module 32 of the generator 24. For this purpose, a valve 76 is inserted in the line 22. This valve, which is controlled by a thermostatic sensor 78 coupled to the said pipe, directs the water from the heating module first towards a relief line 80 and then, when the required temperature has been reached, towards the tubular mixing chamber 20. During the relief stage, the sensor 78 also operates the coupling device 34 of the pumps 16 and 26 in such a way that the pump 16 delivering the concentrate is stopped. The pump 16 is not started until the injection of the superheated water into the tubular mixing chamber 20 begins.

FIG. 1 also shows that the valve 14 placed upstream of the pump 16 possesses a third intermediate inlet connected to a water feed line 82. This particular arrangement makes it possible to rinse and clean the apparatus, for example between the introduction of a concentrate from one of the tanks 10 and the introduction of a concentrate of a different type from the other tank.

Finally, it is possible to make provision for a means ensuring that the prepared concentrate introduced into the metering pump 16 is kept at a constant concentration, such as a concentrate weighing device acting on the flow rate of thinning water so as to keep this concentration constant. The desired value can then be set by simply indicating it with the aid of a control button, if appropriate with intervention by the computer 74.

Of course, the present invention is in no way restricted to the particular method of performing the process and to the particular embodiment described above, and it is perfectly possible to envisage a number of variants thereof without thereby exceeding the scope of the present invention.

What is claimed is:

1. An apparatus for performing the process for the continuouis preparation of food products containing preponderant fraction of contituting liquid, at least part of the constituting liquid superheated to a temperature above about 100° C., said apparatus comprises a tubular mixing chamber (20) connected to a metering pump (16) delivering the concentrate withdrawn from at least one storage tank (10), and to a generator (24) of superheated constituting liquid, said tubular mixing chamber (20) adopts the general shape of a T including:

a vertical tubular branch (18) for the arrival of the concentrate in the ascending direction, an opposite vertical tubular branch (22) for the feeding, in countercurrent, of the superheated constituting liquid, and a horizontal tubular branch (21) allowing the mixture to circulate, the inlet and outlet of the tubular chamber are equipped respectively with non-return means and back-pressure means.

2. The apparatus as claimed in claim 1, wherein the generator (24) of superheated constituting liquid comprises an injection pump (26) feeding the tubular mixing chamber (20) with superheated liquid, and wherein the metering pump (16) and the injection pump (26) are mutually coupled so that their outputs constantly remain proportional.

3. The apparatus as claimed in claim 1, wherein the tubular mixing chamber (20) is equipped with a thermostatic sensor (36) effecting the regulation, as a function of the temperature in the said tubular mixing chamber, of the heating module (32) with which the generator (24) of superheated constituting liquid is provided.

4. The apparatus as claimed in claim 1, which contains, downstairs of the tubular mixing chamber (20), a device for injecting cold sterile water under pressure and at a controlled temperature (52, 54, 55).

5. The apparatus as claimed in claim 1, wherein the tubular mixing chamber (20) is followed by a heat exchanger (40) in which the food product is cooled.

6. The apparatus as claimed in claim 5, wherein the cooling circuit of the heat exchanger (40) is coupled to the water feed circuit of the generator (24) of superheated constituting liquid, and wherein the heat extracted from the food project by the exchanger (40) is recovered for the purpose of heating the feed water for the said generator.

7. The apparatus as claimed in claim 1, wherein a pressure reducing valve/regulator with a calibrated back-pressure valve (66) is located downstream of the heat exchanger (40).

8. The apparatus as claimed in claim 1, which contains, at its outlet, a buffer tank (64) receiving the food product, preferably cooled, the said tank (64) possessing a level sensor (72) which acts on the pump (26) of the generator (24) of superheated constituting liquid.

9. The apparatus as claimed in claim 1, whose outlet is connected directly to a sterile packaging unit (68) which packs the food product treated in this way, without any recycling.

10. The apparatus as claimed in claim 1, wherein a valve (76) is inserted between the tubular mixing chamber (20) and the generator (24) of superheated constituting liquid, the said valve not allowing the injection of liquid into the tubular chamber (20) until the said liquid has reached the required temperature, under the action of a thermostatic sensor (78) which also operates the stopping of the metering pump (16) if there is no injection of liquid.

11. The apparatus as claimed in claim 1, wherein its different contituent elements are controlled and regulated by a programmed computer (74) whose program is determined according to each food product to be prepared.

* * * * *